United States Patent [19]

Bernasconi

[11] 4,242,008
[45] Dec. 30, 1980

[54] RIGID COUPLING

[75] Inventor: Felix Bernasconi, Zollikerberg, Switzerland

[73] Assignee: BBC Brown Boveri & Company Limited, Baden, Switzerland

[21] Appl. No.: 833,687

[22] Filed: Sep. 15, 1977

Related U.S. Application Data

[63] Continuation of Ser. No. 679,017, Apr. 21, 1976, abandoned.

[30] Foreign Application Priority Data

Jul. 4, 1975 [CH] Switzerland ............ 8728/75

[51] Int. Cl.³ ............................................. B25G 3/00
[52] U.S. Cl. ................................... 403/13; 403/334; 403/365; 416/244 A
[58] Field of Search ............ 403/13, 14, 334, 365, 403/37, 16, 31, 34, 15, 335–338; 416/244 A, 244 R; 64/1 S, 1 R, 30 E, 30 R

[56] References Cited

U.S. PATENT DOCUMENTS

| 1,501,994 | 7/1924 | Greve | 64/1 R |
|---|---|---|---|
| 1,908,592 | 5/1933 | Flather | 403/337 X |
| 1,958,621 | 5/1934 | Heppenstall | 403/334 X |
| 2,494,574 | 1/1950 | Murphy | 403/336 |
| 2,715,822 | 8/1955 | Anderson | 64/1 R |
| 2,879,092 | 3/1959 | Hargrove et al. | 403/337 |
| 3,751,941 | 8/1973 | Stiff | 64/30 R X |
| 3,818,722 | 6/1974 | Vogel | 64/30 E |

Primary Examiner—Andrew V. Kundrat
Attorney, Agent, or Firm—Burns, Doane, Swecker & Mathis

[57] ABSTRACT

A rigid coupling between two rotating machines wherein one half of the coupling is provided with a boss which is inserted into a recess provided in the other coupling half. In order to center the boss in the recess, a centering ring is applied to the boss, the external surface of the ring which engages the wall of the recess having a conical configuration with a gradient of from 1:100 to 1:1000 which corresponds to a slope of from 1:200 to 1:2000 respectively. As an alternative, the centering ring can be applied to the wall of the recess, in which case the inner surface of the ring which engages the surface of the boss would be given a conical configuration.

6 Claims, 1 Drawing Figure

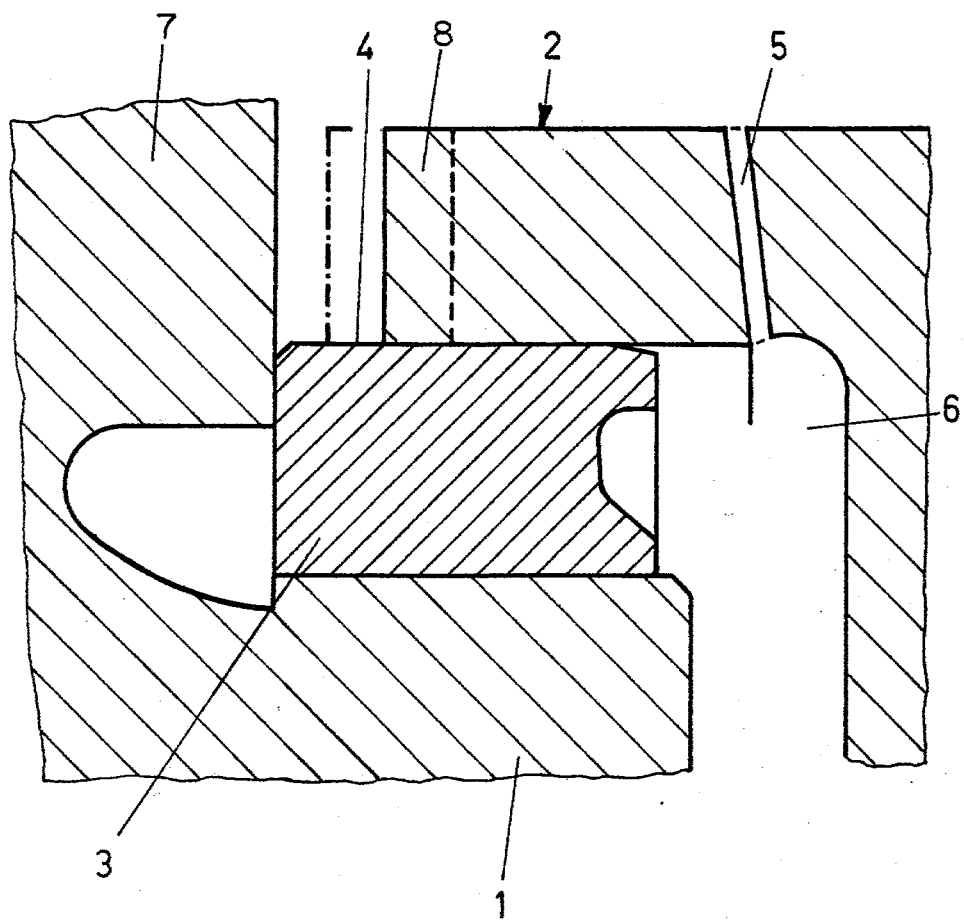

RIGID COUPLING

This is a continuation of application Ser. No. 679,017, filed Apr. 21, 1976 now abandoned.

This invention concerns an improved structure for a rigid coupling between shaft ends of two rotating machines, one half of the coupling i.e. one shaft end provided with a boss being centered in a recess provided in the other coupling half i.e. the other shaft end.

A rigid coupling of two or more rotors is usually effected by means of integrally forged or shrunk-on coupling flanges; coupling sleeves shrunk on to both shaft ends have also been employed.

The purpose of such a coupling is to center the machine shaft axes with respect to each other, and to transmit bending, torsional, axial and shear forces. It is customary to separate these functions from each other, dividing them into a boss and recess for centering purposes and to transmit shear forces, into frictional contact for the torque and shear forces, the coupling bolt tension for frictional contact and flexure of the shafts, and the bolt shear strain in the event of short circuits. Alternative methods include shear sleeves, keys and Hirth-type serrations.

Spigots are also used for the boss arrangement, but these require that the coupling bolts be tightened without heating, or pretensioned hydraulically. If the two halves of the coupling are manufactured independently from each other, the necessary close fit can be achieved only by costly and accurate machining, or by jointly reaming out the spigot holes, while in the latter case replacement without further machining is not possible.

A further known method consists in turning a recess in both halves of the coupling, and fitting a centering plate in this recess.

The arrangement of projections and recesses presents the problem that, to achieve precise centering, these must have little or no play. In the case of high-speed turbo-machines, particularly accurate centering is necessary in order to prevent eccentric running or imbalance which can give rise to vibration. With the known types of friction couplings, changes must always be expected in operation. Relative movement of the coupling halves is restricted by the boss and recess arrangement. Relative radial displacement of the friction surfaces is a result of minute movement due to flexure, shear force and torsion or to spontaneous slip caused by a transverse force or a short-circuit torque. Further radial displacement can occur if the coupling bolts exhibit play within their respective bolt holes, and are subjected to shear stress.

The object of the invention is to create a coupling such that the boss and recess cannot be damaged as the two halves of the coupling are joined together, reaming of the two coupling halves is not necessary when spigots are used, and the rotors can be replaced without further machining, i.e., without using thicker spigots and without the need for re-reaming.

This object is achieved in that a centering ring is located between the two halves of the coupling, and the centering ring is conical in shape.

By providing a conically shaped centering ring, which is either shrunk on to a cylindrical projection of the half of the coupling constituting the boss or inserted in the other half of the coupling provided with a recess, it is much easier to join the shafts if they are not absolutely concentric, as for example the two half-couplings of two turbo-machines. The contact pressure in the event of a radial load on one end remains within the yield point of the material, and also a cylindrical connection eliminates abrasion due to sharp edges. The centering ring preferably has a slope of 1:200.

In alternative forms of the invention the centering ring is joined inseparably to one of the two couplings halves, and it can also be made of a harder material than the two halves of the coupling.

The centering ring can be joined to one of the two coupling halves by shrink-fitting, for example. By using a harder material for the centering ring than for the halves of the coupling, scoring can be avoided, the centering ring can be specially treated, e.g., phosphated and hardened, and it can be machined particularly accurately, whereas methods of this kind are difficult to apply to one of the two coupling halves. Furthermore, with the arrangement comprising a centering ring it is relatively simple and easy to tighten and release the coupling by the known method of a hydraulic device employing high-pressure oil which is admitted to the end face of the projecting boss. This eliminates the need for large press-off bolts, which in addition to the bulky coupling bolts are difficult to accommodate around the circumference of the coupling without weakening the flanges.

The accompanying drawing shows an example of the invention in schematic sectional form.

With reference to the drawing one half of the coupling i.e. the shaft end of the rotor of one machine provided with a projecting boss is denoted by 1, while the shaft end of the other rotor of the other machine provided with a recess is identified by 2. A centering ring 3 is attached to the coupling half 1, by shrinking for example. The outer contour 4 of the centering ring is of conical shape, the gradient of which can be for example between 1:100 and 1:1000, corresponding to a slope of 1:200 to 1:2000. The conical shape of the centering ring 3 allows it to be centered easily and accurately in coupling half 2. Depending on the tolerance of the recess in coupling half 2, coupling half 1 together with its inseparably attached centering ring 3 can be inserted an appropriate distance into the former such that even with a maximum tolerance, as indicated by the broken line, the length of engagement is still sufficient to carry the rotor and align the coupling flanges 7, 8. With a minimum tolerance, the coupling half 1, together with the centering ring 3, can be inserted correspondingly further into coupling half 2 so that the final position corresponds approximately to the chain-dotted line. It is also of benefit if coupling half 2 incorporates a high-pressure oil port 5 which terminates in a pressure chamber 6. By attaching a hydraulic press-off device (not shown) to the high-pressure oil port 5, the two halves 1 and 2 of the coupling can be separated by admitting pressurised oil to the end face of coupling half 1, whereupon this is forced away from coupling half 2.

The configuration described above is not restricted to what is shown in the drawing. The centering ring 3, for example, could also be located in the recessed half 2 of the coupling, in which case its conically shaped inner circumference faces in the direction of the coupling half with a projecting boss 1.

I claim:

1. In a rigid coupling between adjoining shaft ends of the two rotor components of two machines, and wherein the end faces of said shaft ends are ultimately forced into frictional engagement to transmit bending, torsion and axial forces which arise in the coupling the improvement wherein for coupling and simultaneously centering said shaft ends, the shaft end of one of said machines is provided with an axially projecting boss, the shaft end of the other machine is provided with an axially extending recess for receiving said boss, and wherein a centering ring having a slightly frusto-conical centering surface is disposed between said boss and recess, the centering between said boss and recess being effected in a progressive manner by axial movement of said shaft ends toward each other accompanied by sliding frictional engagement between the frusto-conical surface of said ring and the adjoining surface on said boss or recess, the engagement between said ring and adjoining boss or recess serving also to transmit shear forces which arise in the coupling, the internal surface of said centering ring being secured to the surface of said boss and the slightly frusto-conical centering surface being formed on the external surface thereof and engaging the surface within said recess, the surface within the recess being cylindrical and the slightly frusto-conical centering surface being adjacent said cylindrical surface.

2. A rigid coupling as defined in claim 1 wherein said centering ring is made of a material which is harder than that of said shaft ends.

3. The rigid coupling of claim 1 wherein said slightly frusto-conical centering surface has a gradient between 1:100 and 1:1000.

4. In a rigid coupling between adjoining shaft ends of the two rotor components of two machines, and wherein the end faces of said shaft ends are ultimately forced into frictional engagement to transmit bending, torsion and axial forces which arise in the coupling the improvement wherein for coupling and simultaneously centering said shaft ends, the shaft end of one of said machines is provided with an axially projecting boss, the shaft end of the other machine is provided with an axially extending recess for receiving said boss, and wherein a centering ring having a slightly frusto-conical centering surface is disposed between said boss and recess, the centering between said boss and recess being effected in a progressive manner by axial movement of said shaft ends toward each other accompanied by sliding frictional engagement between the frusto-conical surface of said ring and the adjoining surface on said boss or recess, the engagement between said ring and adjoining boss or recess serving also to transmit shear forces which arise in the coupling, the external surface of said centering ring being securec to the surface within said recess and the slightly frusto-conical centering surface being formed on the internal surface thereof and engaging the surface on said boss the surface of the boss being cylindrical and the slightly frusto-conical centering surface being adjacent said cylindrical surface.

5. The rigid coupling of claim 4 wherein the centering ring is of a material which is harder than the material of said first and second shaft ends.

6. The rigid coupling of claim 4 wherein said slightly frusto-conical centering surface has a gradient between 1:100 and 1:1000.

* * * * *